United States Patent
Strogov et al.

(10) Patent No.: US 11,516,247 B2
(45) Date of Patent: Nov. 29, 2022

(54) SYSTEM AND METHOD FOR PROTECTING NETWORK RESOURCES

(71) Applicant: Acronis International GmbH, Schaffhausen (CH)

(72) Inventors: Vladimir Strogov, Moscow (RU); Alexey Dod, Moscow (RU); Valery Chernyakovskiy, Moscow (RU); Serguei Beloussov, Costa Del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 260 days.

(21) Appl. No.: 16/709,985

(22) Filed: Dec. 11, 2019

(65) Prior Publication Data

US 2020/0186542 A1  Jun. 11, 2020

Related U.S. Application Data

(60) Provisional application No. 62/777,853, filed on Dec. 11, 2018.

(51) Int. Cl.
*H04L 9/40* (2022.01)

(52) U.S. Cl.
CPC ........ *H04L 63/145* (2013.01); *H04L 63/0227* (2013.01); *H04L 63/1416* (2013.01)

(58) Field of Classification Search
CPC ............... H04L 63/145; H04L 63/0227; H04L 63/1416; G06F 21/554; G06F 21/566; G06F 21/78
See application file for complete search history.

(56) References Cited

U.S. PATENT DOCUMENTS

| | | | | |
|---|---|---|---|---|
| 8,046,547 | B1* | 10/2011 | Chatterjee | G06F 11/1461 711/E12.003 |
| 2011/0258164 | A1* | 10/2011 | Mandagere | G06F 16/2358 707/685 |
| 2013/0268545 | A1* | 10/2013 | Burchett | G06F 16/986 707/754 |
| 2014/0236898 | A1* | 8/2014 | Hankins | G06F 3/0689 707/639 |
| 2018/0157834 | A1* | 6/2018 | Continella | G06F 21/554 |
| 2018/0330088 | A1* | 11/2018 | Crofton | G06F 21/566 |

(Continued)

*Primary Examiner* — Christopher C Harris
(74) *Attorney, Agent, or Firm* — ArentFox Schiff LLP; Michael Fainberg

(57) ABSTRACT

The present disclosure includes methods and systems for protecting network resources. An exemplary method comprises starting, by a processor, copy-on-write snapshotting for modifications to a plurality of files in storage, the modification initiated by a suspicious application, detecting, by the processor, a modification of a file of the plurality of files, determining, by the processor, whether the file is stored on a shared network resource or a local resource, in response to determining that the file is stored on a shared network resource, determining, by the processor, that a current region being modified is not already saved in a snapshot, and if the current region is not saved, saving the current region to a snapshot, marking, by the processor, the current region as being saved and analyzing all saved regions that were modified for malicious activity to determine that the suspicious application modifying the saved regions is malicious.

12 Claims, 6 Drawing Sheets

(56) References Cited

U.S. PATENT DOCUMENTS

| | | | |
|---|---|---|---|
| 2019/0095285 A1* | 3/2019 | McCormack | G06F 11/1451 |
| 2019/0228148 A1* | 7/2019 | Pohl | G06F 3/0659 |
| 2019/0286373 A1* | 9/2019 | Karumbunathan | G06F 3/065 |
| 2020/0004962 A1* | 1/2020 | Araujo | G06F 21/577 |

* cited by examiner

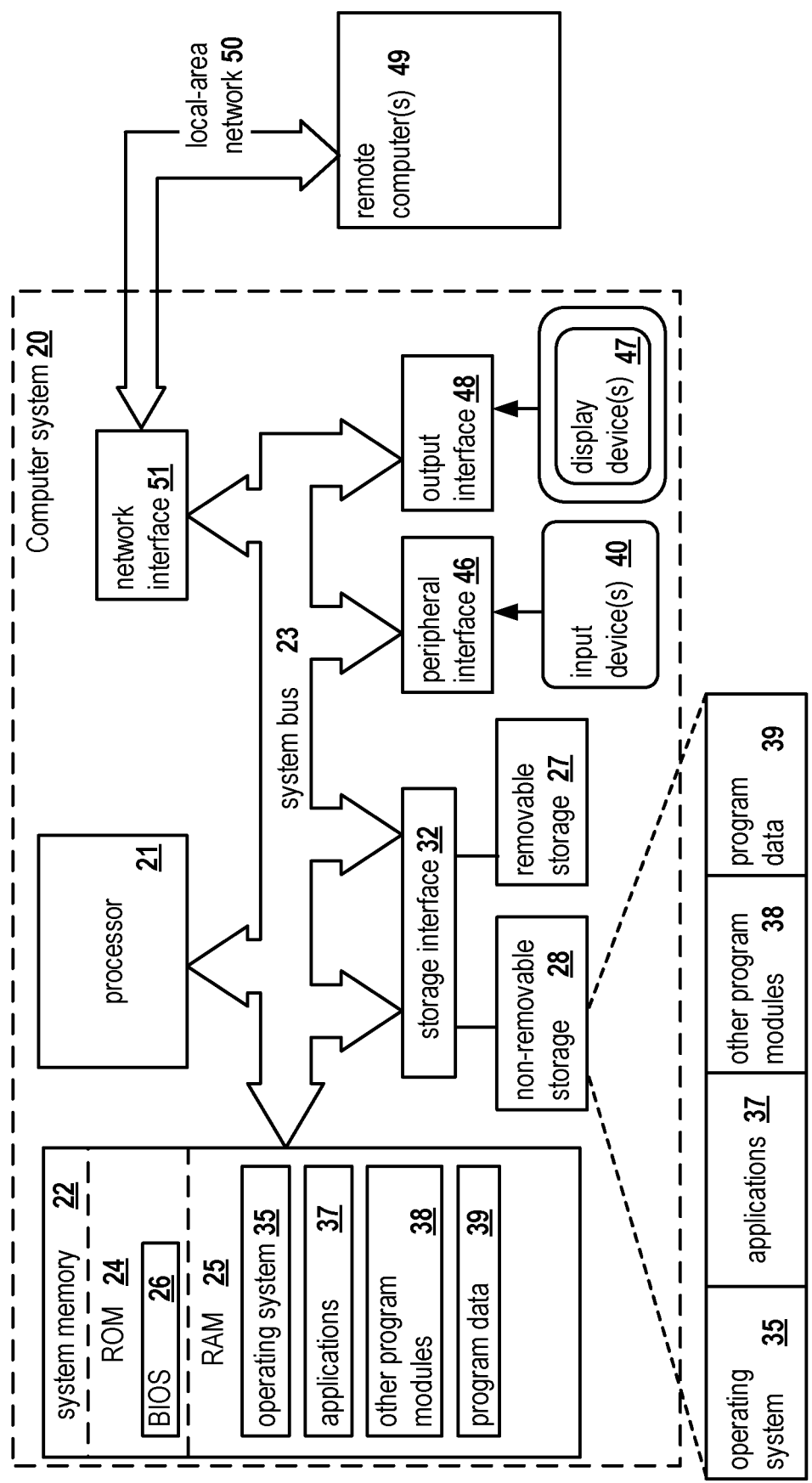

SYSTEM AND METHOD FOR PROTECTING NETWORK RESOURCES

CROSS-REFERENCE TO RELATED APPLICATIONS

This application claims benefit of priority to U.S. Provisional Patent Application No. 62/777,853 filed on Dec. 11, 2018, which is herein incorporated by reference in its entirety.

FIELD OF TECHNOLOGY

The present disclosure relates generally to the field of data protection and resilience and, more specifically, to systems and methods for protecting network resources.

BACKGROUND

Typically, software that protects files against malware and ransomware operates on local disks of user computers. Generally, such software does not track suspicious processes that are on shared network resources (e.g., a network drive) available for the clients (users) locally. Users can mount network folders onto their system as network drives and retrieve or store data from/to those network drives under the impression that these drives are protected by anti-virus and malware software, while the network drives are actually unprotected and vulnerable to malicious programs.

For example, Network Attached Storage (NAS) devices can be accessed by users by assigning a drive letter (i.e., mount the drive/device) or can be accessed by using the network addresses of a drive/device to open or write to files located on such drives.

Drives that are local can be protected because malicious activity can be intercepted at the paging I/O level in WINDOWS or at the PAGEIN or PAGEOUT operation level in MACOS. However, malicious activity cannot be intercepted at the system level for network shared resources because the intercepting software does not have access to the system levels of the network devices, and often I/O data flows for files on the network device at all levels of I/O (e.g., where the upper level is system cache and the lower level is paging I/O) are not taken into account.

SUMMARY

Aspects of the disclosure relate to the field of protecting network resources from malicious software across various flows.

In one exemplary aspect, a method comprises starting, by a processor, copy-on-write snapshotting for modifications to a plurality of files in storage, the modification initiated by a suspicious application; detecting, by the processor, a modification of a file of the plurality of files, determining, by the processor, whether the file is stored on a shared network resource or a local resource; in response to determining that the file is stored on a shared network resource, determining, by the processor, that a current region being modified is not already saved in a snapshot, and if the current region is not saved, saving the current region to a snapshot; marking, by the processor, the current region as being saved; and analyzing all saved regions that were modified for malicious activity to determine that the suspicious application modifying the saved regions is malicious.

In one aspect, the method further comprises in response to determining that the file is stored on the local resource, determining whether the file is using non-cached I/O; in response to determining that the file is using non-cached I/O and determining that the file is stored on the local resource, saving original data of the file to a snapshot during non-cached IO, otherwise: determining that the file is stored on a remote volume and saving original data of the file to a snapshot during both cached and non-cached IO.

In one aspect, the current region is unaligned, and in another aspect, the current region is byte-aligned.

In one aspect, alignment information is stored in a bitmap.

In one aspect, the method further comprises maintain a bitmap by extending byte-aligned data regions to physical sector-aligned data blocks.

In one aspect, the method further comprises determining that a data region where the file is to be written is unaligned; and performing one of: (1) aligning the data region to work in fixed data blocks, (2) rounding the data region, or (3) extending the data region.

In one aspect, one or more file system filters are used to capture data flows across local resources and network resources.

In one aspect, a first file system filter intercepts data access across local resources and a second file system filter intercepts data access across network resources.

In another exemplary aspect, a method is directed to protecting network resources in a MACOS environment. The method comprises starting, by a processor, copy-on-write snapshotting for modifications to a plurality of files stored on electronic storage; monitoring, by the processor, access to objects within a file system associated with the electronic storage for a set of operations; intercepting, by the processor, one or more operation of the set of operations for modifying a region of a file in the file system; capturing, by the processor, one or more of original contents, modified contents and written contents of the region; ending, by the processor, copy-on-write snapshotting; and performing malware and/or ransomware analysis on a process performing the modification to the region of the file in the file system.

In one aspect, the set of operations comprise a write operation, a set attribute truncate operation, and a pageout operation.

In one aspect, the method further comprises in response to intercepting a write operation, capturing the original contents and modified contents of the region; in response to intercepting a set attribute operation, capturing the original contents of the region; and in response to intercepting a pageout operation, capturing the original contents and modified contents.

In one aspect, the intercepting is performed using callback functions.

In one aspect, the callback functions are KAUTH callbacks.

In one aspect, the KAUTH callbacks comprise: WRITE, SETATTR and PAGEOUT.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 6 is a block diagram of a computer system on which the disclosed system and method can be implemented according to an exemplary aspect.

DETAILED DESCRIPTION

Exemplary aspects are described herein in the context of a system, method, and computer program product for protecting network resources. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
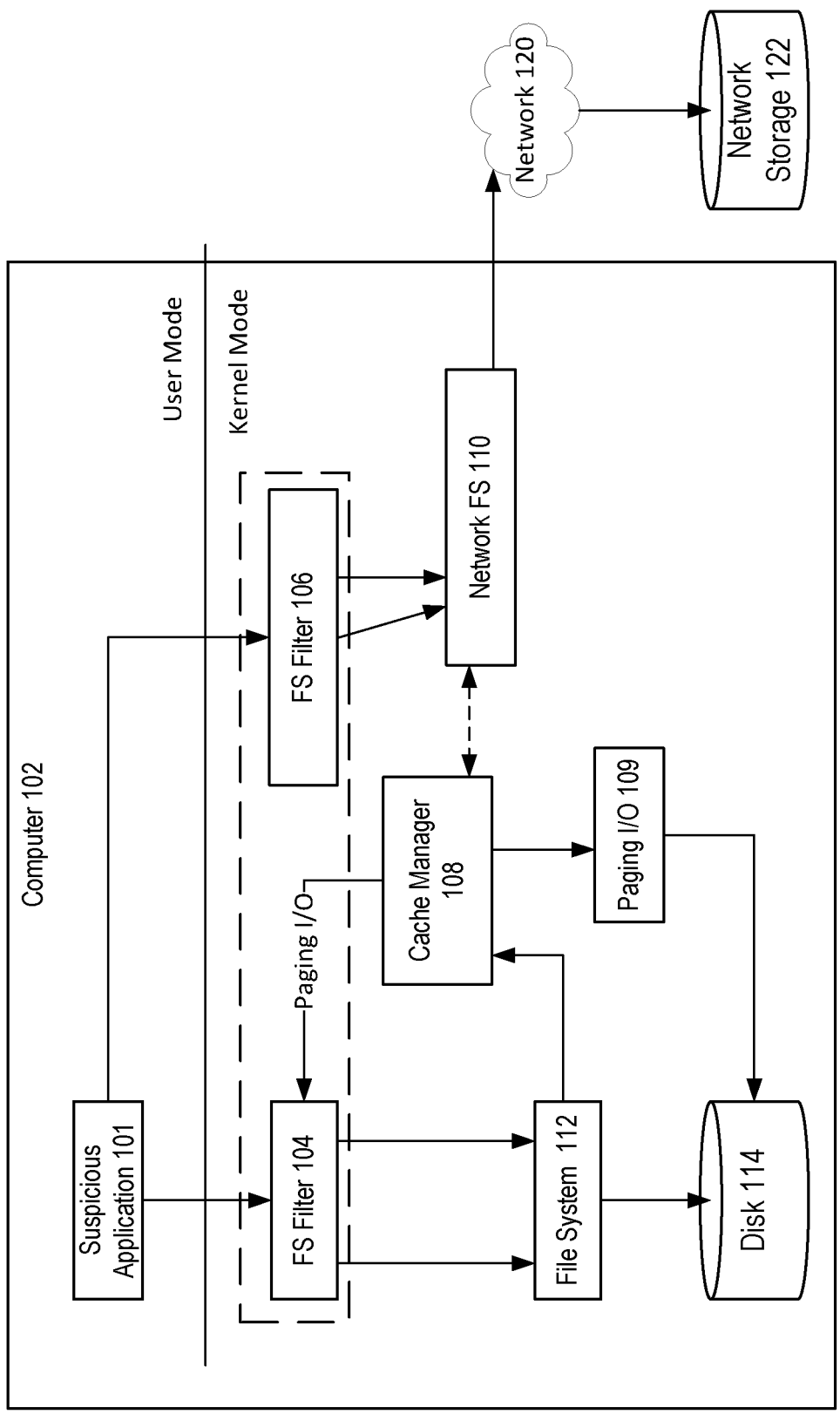
FIG. 1 is a block diagram illustrating a system for protecting network resources, in accordance with exemplary aspects of the present disclosure.

FIG. 1 is a block diagram illustrating a system 100 for protecting network resources, according to an exemplary aspect. The system 100 comprises a computer 102 executing a suspicious application 101 in user mode. The computer 102 may have a local disk 114 and have access to a file system, e.g., network file system 110 that accesses network storage 122 over a network, e.g., network 120. In an exemplary aspect, the computer 102 implements a first file system filter 104 and a second file system filter 106 both in kernel mode that intercept calls from the suspicious application 101, respectively, to the file system 112 and the network file system 110. In some aspects, the file system filter 104 and 106 are the same functional filter driver, but comprise different instances of the same filter attached to different file systems. In some aspects, copy-on-write snapshotting is performed for both the file system 112 and the network FS 110 by a single filter as shown by the dashed outline around FS filter 104 and FS filter 106.

In exemplary aspects, when the file system 112 receives a cached I/O request, the file system 112 calls the cache manager 108 to serve this request. In some cases, a page fault can occur if the requested data is not present in the cache, so a paging I/O read operation is generated by the cache manager 108 (or, in other operating systems, a Memory Manager pair). In other words, the cache manager 108 asks the file system 112 to find the requested data by reading a page from disk into memory. The generated I/O is referred to as paging I/O 109. For a WINDOWS network file system, it is not possible to predict whether the Network File System 110 will use the cache manager 108 for cached I/O or call the network storage 122 (i.e., the network layer) directly. This illustrates why the need arises to take into account all I/O levels for systems with both local and network storage. Though these details describe the operation of primarily WINDOWS, in MACOS details may vary but the main deficiency remains: the inability to track some I/O for network file system paths, namely unreliable tracking of file open operations in the authorization system of MACOS, namely KAUTH_FILE_OPEN.

In order to provide real-time protection and subsequent data recovery for shared resources, I/O data flows at all levels are taken into account by the first file system filter 104 and the second file system filter 106 in some operating systems, for example WINDOWS. In WINDOWS, such data flow that is accounted for includes non-cached I/O, custom non-cached I/O issued by an application and system paging I/O. In other operating systems, callbacks are placed at the file system level when certain operations are performed on files that trigger copying original, modified and written to versions of the file to disk. Specifically, for example, in MACOS, "vnode" callbacks are implemented using kernel authorization, or "KAUTH". The present disclosure does not limit the operating system wherein the disclosed methods and systems are used. In fact, the methods and systems described herein can be applied to many different operating systems that are able to mount both local and network file storage, where the operating system allows for system-level hooks into file operations. Accordingly, both cached I/O and non-cached I/O is accounted for in a snapshot of files on mounted file systems. In this manner, attempts from a suspicious applications executing on a computer to modify files on local disk and on a network resource are both intercepted and analyzed for malicious activity.

According to this aspect, all data flows are accounted for when protecting the computer 102, including I/O flows to the network file system 110 and the local file system 112. In this aspect, copy-on-write operations are performed by the first file system filter 104 for local file system 112, while copy-on-write operations are performed by the second file system filter 106 for network FS 110 to save user data from malicious modification by the suspicious application 101.

Figure 2:
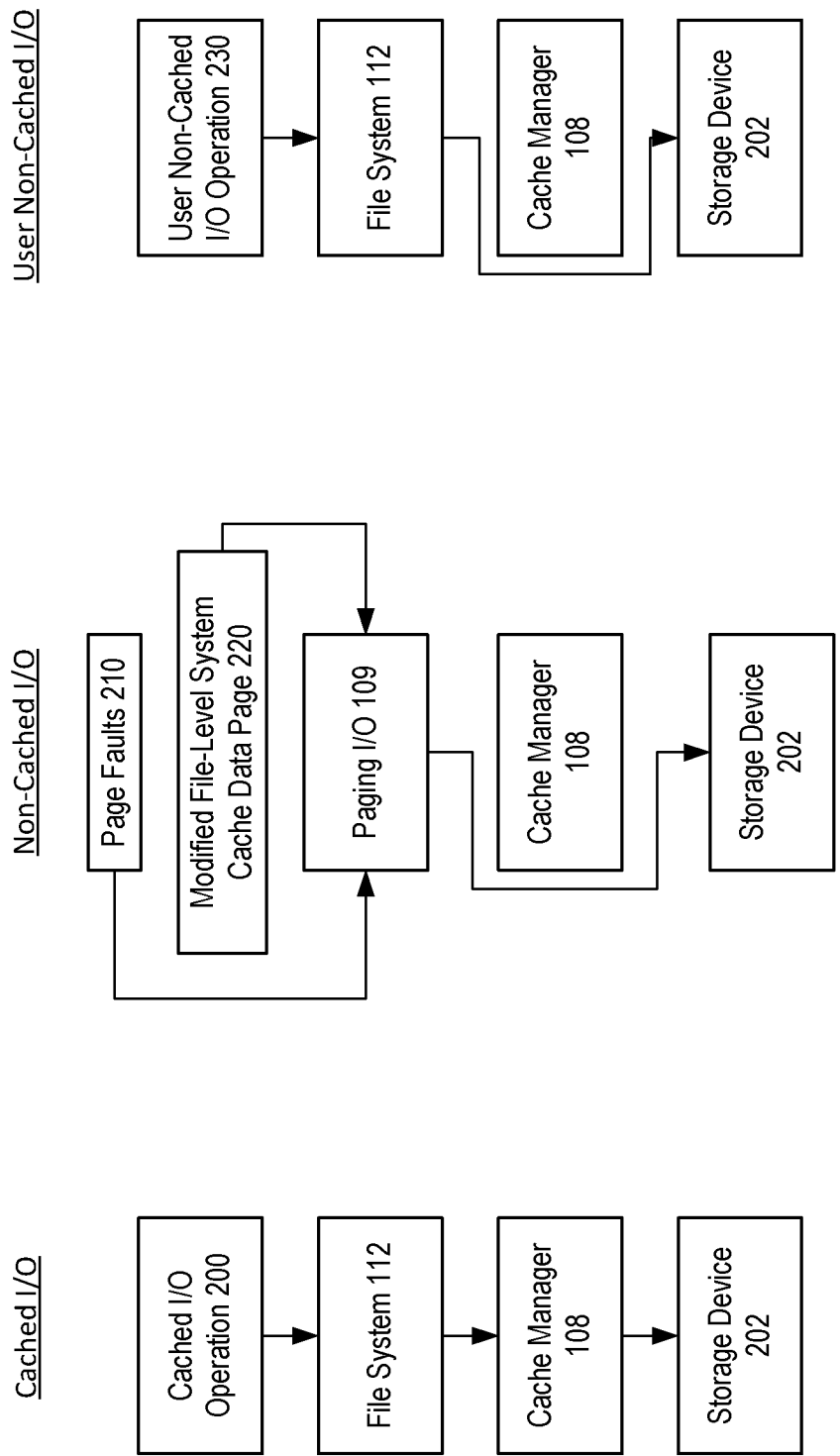
FIG. 2 illustrates an example of the various caching mechanisms in a computer system, in accordance with exemplary aspects of the present disclosure.

FIG. 2 illustrates an example of the various caching mechanisms described with respect to computer system 100, in accordance with exemplary aspects of the present disclosure. The types of input/output illustrated in FIG. 2 are cached I/O and non-cached I/O. Cached I/O is the I/O that flows between applications at the application level and the system cache via file system 112. In cached I/O operation 200, file system 112 forwards the I/O request to the cache manager 108, that is directed to storage device 202. Non-cached I/O refers to input/output requests that are caused by page faults 210, or when file-level system cache data page 220 is modified, e.g. paging I/O 109. Paging I/O 109 does not pass through cache manager 108 and instead proceeds directly to the storage device 202. User non-cached I/O operation 230 refers to a direct connection to storage 202, without paging I/O 109 or cache manager 108. Specifically, file system 112 forwards the I/O request directly to storage device 202.

In some aspects, during I/O that is cached (i.e., an I/O request that writes to a data region), data regions can be unaligned (also referred to as byte-aligned), for example writing 10 bytes. Non-cached IO is, however, sector-aligned, for example 512 bytes. In general, a bitmap for aligned data blocks is maintained by a filter driver, and aligned data blocks that are the same size can be tracked easily. However, unaligned data regions cannot be handled with the same bitmap as aligned data regions. Unaligned data regions are mapped to the same bitmap, extending ranges where necessary to use the bitmap in the methods and systems described above.

Figure 3:
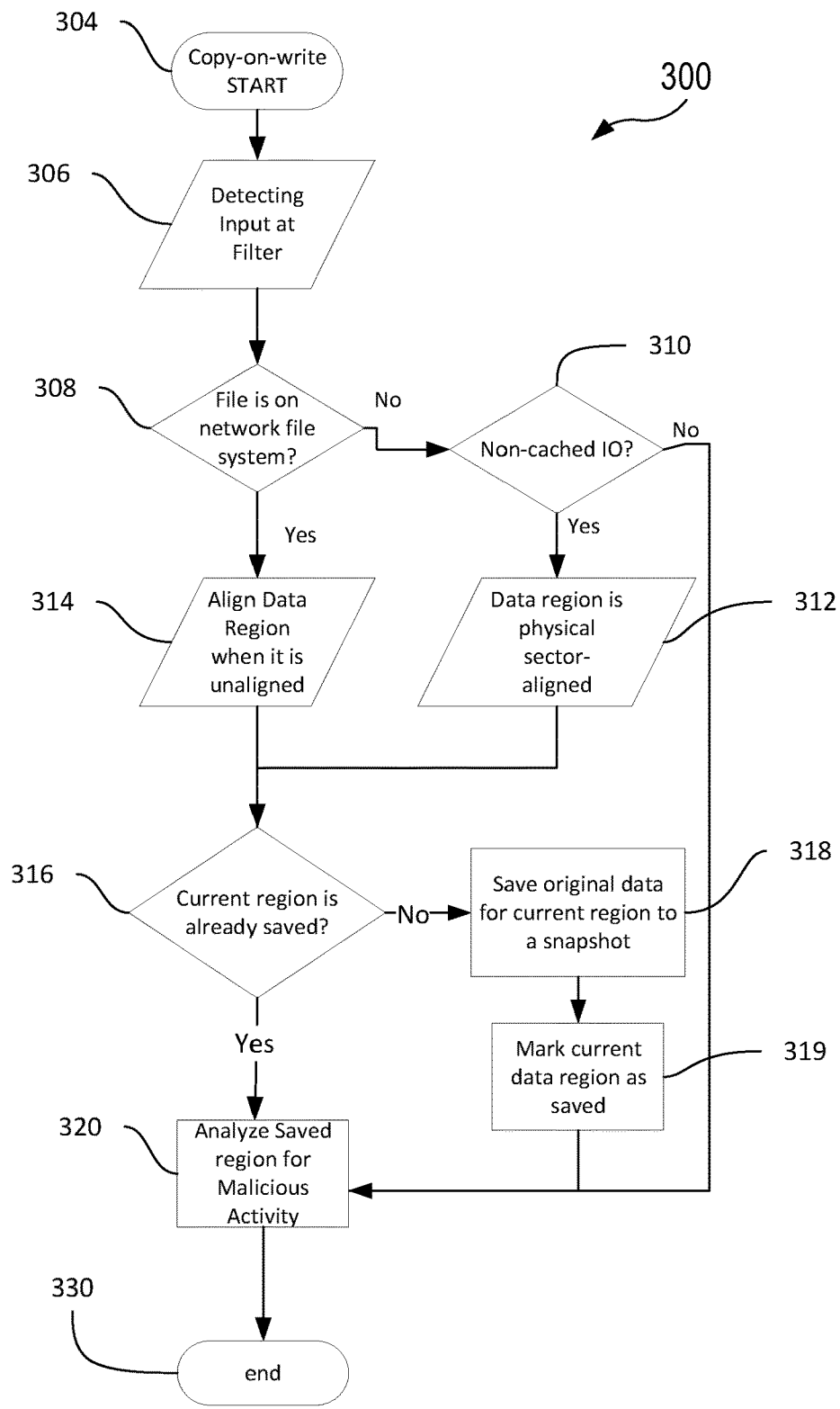
FIG. 3 is a flowchart illustrating a method for protecting network resources in a WINDOWS™ operating system (OS) environment, in accordance with exemplary aspects of the present disclosure.

FIG. 3 is a flow diagram illustrating a method 300 for protecting network resources in a WINDOWS OS environment according to an exemplary aspect. It is noted that the following description of the exemplary method makes reference to the system and components described above. In some aspects, system 100 is an exemplary implementation of method 300 on a particular operating system, such as WINDOWS.

The method 300 begins at 302 and proceeds to 304.

At step 304, a filter (for example, file system filter 104), starts copy-on-write snapshotting that saves user data before they are maliciously modified, whether on network storage, or on storage local to the filter.

At 306, the filter detects a WRITE operation and observes the context of the operation. In some exemplary aspects, the context includes the file being written, the data region offset of where the file is to be written and size of data to be written, flags indicating cached or non-cached IO or the like. In exemplary aspects, the offset refers to the logical offset from the beginning of the file. The bitmap directly maps to the chunks of the region with this offset.

At 308, the filter determines whether the file being accessed for a WRITE operation is stored on a network file system or it is stored elsewhere. If the file being accessed for a WRITE operation is located and/or stored in a network file system, the method 300 proceeds to step 314. At 314, if the data region where the file is to be written is unaligned, the filter may align the data region to work in fixed data blocks. In other exemplary aspects, if the data region is unaligned, other structures may be maintained to save such regions. In some aspects, if the data region is unaligned, the data region is rounded, or, extended. For example, elements of a bitmap storing offsets for data regions map to aligned chunks (sectors) and in the case of cached I/O, regions are not aligned and are therefore rounded (extended) to aligned regions in order to use the bitmap. The aligned chunks correspond exactly to non-cached requests, but cached requests can overlap them. Therefore, extending is required to operate in terms of aligned chunks.

However, if the file being accessed for a WRITE operation is not located or stored in a network file system, the method 300 proceeds to step 310.

Another determination is made at step 310 as to whether the WRITE operation is classified non-cached IO. If the operation is not non-cached IO, then the method proceeds to step 320.

If at 310 however, the WRITE operation is classified as non-cached IO, then the method proceeds to 312. At 312, the data region is already physical sector-aligned.

The method proceeds to 316, after either step 312 or step 314. At 316, the filter determines whether the current data region is already saved in a snapshot. If, at 316, the current region is already saved, then the method proceeds to step 320.

If at 316 the current region is not already saved, the original data for the current region is saved to a snapshot at 318. Subsequently, from 318 the method 300 moves to step 319, where the current data region is then marked as being saved.

At 321, all saved regions are analyzed to determine whether attempts to modify the saved regions were malicious or suspicious, and if so, performing a remediating action in response to the modifying application.

The copy-on-write snapshot terminates at step 330.

Figure 4:
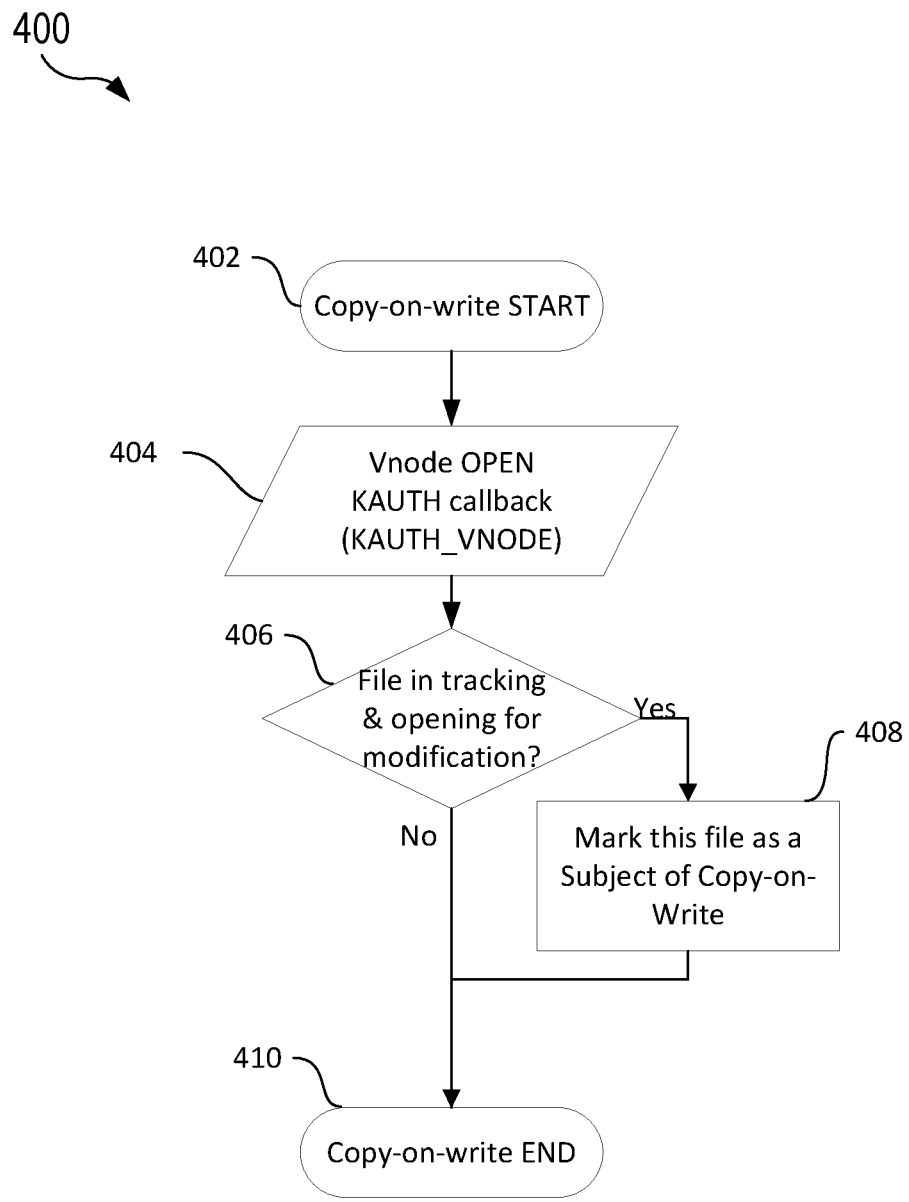
FIG. 4 is a flowchart illustrating a stage of processing of file I/O in a MACOS environment, in accordance with exemplary aspects of the present disclosure.

FIG. 4 is a flow diagram illustrating a first stage of processing of file I/O in a MACOS environment according to an exemplary aspect. It is noted that the following description of the exemplary method makes reference to the system and components described above.

In one aspect, this stages illustrated herein perform copy-on-write snapshotting on operating systems such as MACOS or OSX.

In this processing stage, the vnode (file) being opened is analyzed to determine if the vnode will be subject to a subsequent copy-on-write. Only those "opens" with WRITE access to track file vnodes are considered to be copied-on-write in subsequent stages (e.g., stages shown in FIG. 5).

At step 402, a filter begins copy-on-write snapshotting. In exemplary aspects, copy-on-write for network file systems are performed on particular Vnode intercept callbacks, including: "Write", "Set Attribute File Truncating" and "Page-Out".

At 404, the filter seeks to establish a scope of authorization within the virtual file system (VFS) layer using a kernel authorization (KAUTH) callback function. The KAUTH callback function intercepts all calls to open a file on the file system.

At step 406, the filter determines whether a read file that is being tracked is opened for modification.

If at 406, the file is not being opened, the method proceeds to step 410, where copy-on-write checking ends.

However, if at 406, the file is being opened for modification, the method 400 proceeds to 408, where this file is marked as the subject of a copy-on-write. The method then proceeds to 410, where copy-on-write is ended.

Figure 5:
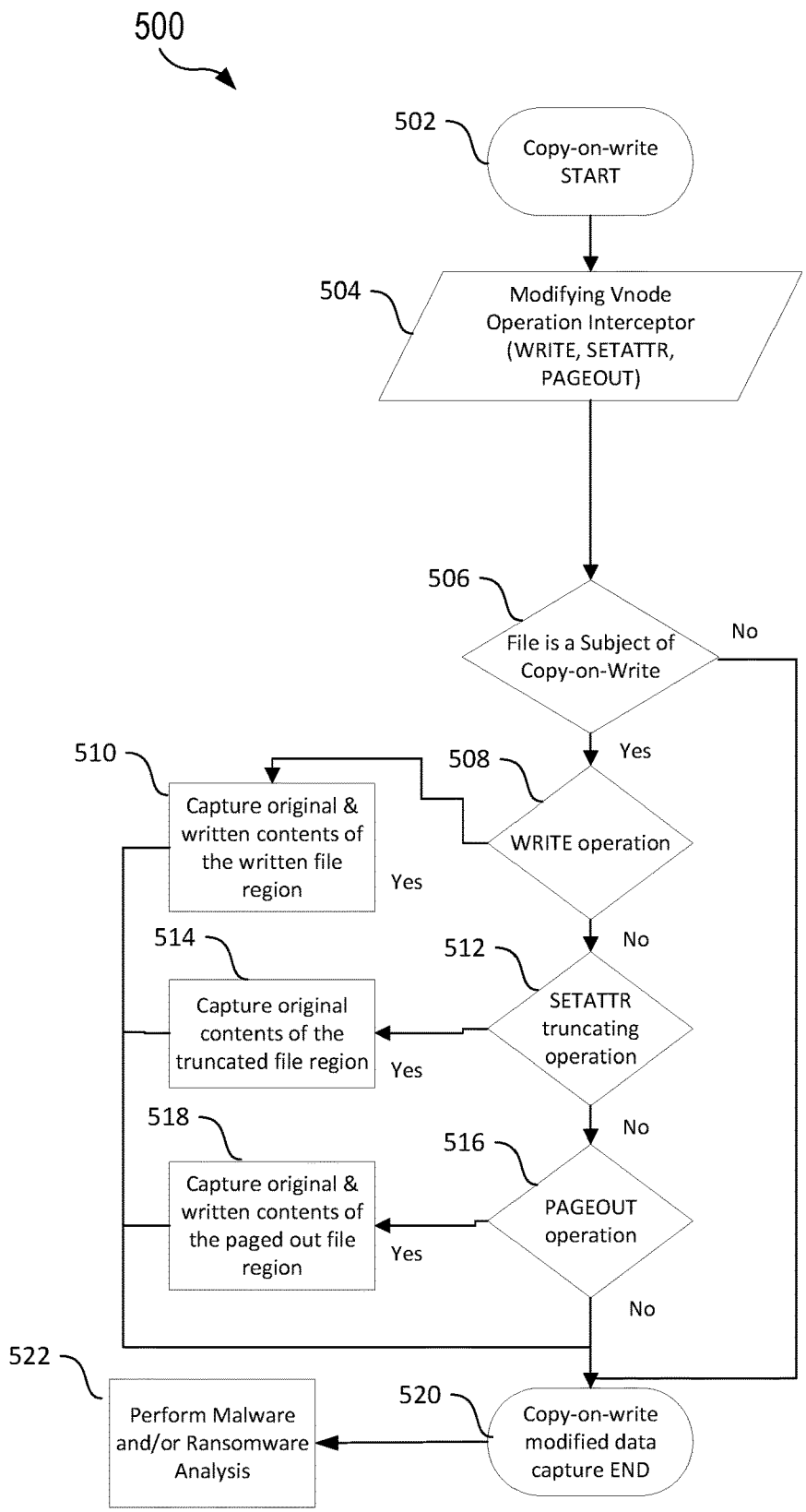
FIG. 5 is a flowchart illustrating another stage of file I/O processing in a MACOS environment, in accordance with exemplary aspects of the present disclosure.

FIG. 5 is a flow diagram illustrating a second and third stage of file I/O processing according to an exemplary aspect. It is noted that the following description of the exemplary method makes reference to the system and components described above.

The method begins at 502 where a filter starts copy-on-write data capture. The filter performs copy-on-write on newly introduced vnode interceptors (i.e., intercepted I/O handlers of vnode). For example, Each vnode refers to a table of operations applying to it, such as OPEN, CLOSE, READ, WRITE, SETATTR, etc. The operation table is common for all vnodes of certain file system. Each operation in the table may be intercepted apart from other operations. This is because KAUTH_FILE_OPEN, a callback issued by the KAUTH subsystem on file open operations, for network file I/O is inherently unreliable. In one aspect, this copy-on-write captures both original and modified file contents when the respective change is detected.

At 504, the filter operates on three particular file modifications: intercepting write (WRITE) modifications, set attribute (SETATTR) modifications and page out (PA- GEOUT) modifications. In some aspects, it is possible to intercept more modifying vnode operations such as SETXATTR and RMDIR.

At 506, the filter determines whether a file being modified is the subject of copy-on-write. If the file is determined to not be the subject of copy-on-write snapshotting, then the copy-on-write ends at 520 and the method proceeds to 522 where a malware and/or ransomware analysis performed.

Otherwise, if the file is determined to be the subject of copy-on-write snapshotting at 506, the method 500 moves to 508. At 508, if a WRITE operation is detected by the filter, the method proceeds to 510, where the filter captures the original and modified contents of the modified file region. In one aspect, such a determination is made by analyzing the vnode interceptors to determine whether the interceptor has been called on the WRITE operation, though other implementations are considered by the present disclosure.

If however, the operation is not a WRITE operation, the method proceeds to step 512, where the filter determines whether a SETATTR truncating operation is being performed on the file. If so, the method proceeds to 514, where the filter captures the original contents of the truncated file region.

If however, the operation is not a SETATTR operation either, the method 500 proceeds to step 516, where the filter determines whether a PAGEOUT operation (i.e., a page stored in the system cache is writing to the disk file) is being performed on the file. If so, the method proceeds to 518, where the filter captures the original and written contents of the paged out file region.

The method proceeds to step 520, where the filter ends copy-on-write modification data capture.

At 522, malware or ransomware analysis proceeds before the original data is overwritten or destroyed.

According to one aspect, the stages of I/O processing described in FIG. 5 allow a system to capture file contents on detection of a modifying operation, avoiding the extraneous data snapshotting that may occur in previous solutions that capture file contents on both opening of the file and on closing of the file. Malware decisions are then made after the new contents are captured. Further, the stages described in FIG. 5 permit the detection of ransomware or malware behavior earlier than previous solutions.

Previously, ransomware detection was performed on the KAUTH_FILEOP_CLOSE callback of the KAUTH subsystem. The KAUTH_FILEOP_CLOSE handler compared the latest file content with the state of a previously saved file content, i.e., file contents saved on KAUTH_FILEOP_OPEN. In FIGS. 4 and 5, the malware behavior may be detecting earlier, for example, on a file modifying operation such as WRITE, TRUNCATE, and PAGEOUT, before original data is overwritten or destroyed.

FIG. 6 is a block diagram illustrating a computer system 20 on which aspects of systems and methods for protecting network resources may be implemented in accordance with an exemplary aspect. It should be noted that the computer system 20 can correspond to the computer 102, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:
1. A method for protecting network resources comprising:
starting, by a processor, copy-on-write snapshotting for modifications to a plurality of files in storage, the modification initiated by a suspicious application;
detecting, by the processor, a modification of a file of the plurality of files;

determining, by the processor, whether the file is stored on a shared network resource or a local resource;

in response to determining that the file is stored on a shared network resource, determining, by the processor, that a current region of the file being modified is not already saved in a snapshot, and if the current region is not saved, saving the current region to a snapshot;

marking, by the processor, the current region as being saved; in response to determining that the file is stored on the local resource, determining whether the file is using non-cached I/O;

in response to determining that the file is using the non-cached I/O and determining that the file is stored on the local resource, saving original data of the file to the snapshot during the non-cached I/O, otherwise:

determining that the file is stored on a remote volume and saving original data of the file to the snapshot during both cached and non-cached I/O analyzing all saved regions that were modified and are associated with the snapshot for malicious activity; and determining, based on the analyzing, that the suspicious application modifying the saved regions is malicious.

2. The method of claim 1, further comprising determining that the current region is unaligned.

3. The method of claim 2, further comprising storing alignment information in a bitmap.

4. The method of claim 2, further comprising:

maintaining a bitmap by extending byte-aligned data regions, where the file is to be written, to physical sector-aligned data blocks.

5. The method of claim 4, further comprising:

determining that a data region where the file is to be written is unaligned; and performing one of:
  aligning the data region to work in fixed data blocks;
  rounding the data region; or
  extending the data region.

6. The method of claim 1, wherein one or more file system filters are used to capture data flows across local resources and network resources.

7. The method of claim 1, wherein a first file system filter intercepts data access across local resources and a second file system filter intercepts data access across network resources.

8. A system for protecting network resources comprising:
a hardware processor configured to:
start copy-on-write snapshotting for modifications to a plurality of files in storage, the modification initiated by a suspicious application;

detect a modification of a file of the plurality of files;

determine whether the file is stored on a shared network resource or a local resource;

in response to determining that the file is stored on a shared network resource, determine that a current region of the file being modified is not already saved in a snapshot, and if the current region is not saved, save the current region to a snapshot;

mark the current region as being saved; in response to determining that the file is stored on the local resource, determine whether the file is using non-cached I/O;

in response to determining that the file is using the non-cached I/O and determining that the file is stored on the local resource, save original data of the file to the snapshot during the non-cached I/O, otherwise:

determine that the file is stored on a remote volume and save original data of the file to the snapshot during both cached and non-cached I/O analyze all saved regions that were modified and are associated with the snapshot for malicious activity; and determine, based on the analyzing, that the suspicious application modifying the saved regions is malicious.

9. The system of claim 8, further comprising determining that the current region is unaligned.

10. The system of claim 9, further comprising storing alignment information in a bitmap.

11. The system of claim 10, wherein the hardware processor is further configured to:

maintain a bitmap by extending byte-aligned data regions, where the file is to be written, to physical sector-aligned data blocks.

12. The system of claim 11, wherein the hardware processor is further configured to:

determine that a data region where the file is to be written is unaligned; and perform one of:
  align the data region to work in fixed data blocks;
  round the data region; or
  extend the data region.

\* \* \* \* \*